(12) United States Patent
Ko

(10) Patent No.: US 10,731,744 B2
(45) Date of Patent: Aug. 4, 2020

(54) SPEED REDUCER FOR VEHICLE

(71) Applicant: Mando Corporation, Pyeongtaek-si, Gyeonggi-do (KR)

(72) Inventor: Bong Sung Ko, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 595 days.

(21) Appl. No.: 15/599,560

(22) Filed: May 19, 2017

(65) Prior Publication Data

US 2017/0335943 A1 Nov. 23, 2017

(30) Foreign Application Priority Data

May 19, 2016 (KR) .................. 10-2016-0061566

(51) Int. Cl.
*F16H 55/24* (2006.01)
*F16D 3/68* (2006.01)
(Continued)

(52) U.S. Cl.
CPC ............. *F16H 55/24* (2013.01); *F16D 1/076* (2013.01); *F16D 3/12* (2013.01); *F16D 3/68* (2013.01);
(Continued)

(58) Field of Classification Search
CPC . F16H 55/24; F16D 1/076; F16D 3/12; F16D 3/68
See application file for complete search history.

(56) References Cited

U.S. PATENT DOCUMENTS 3,645,114 A * 2/1972 Shepherd .................. F16D 3/68
464/74
4,172,369 A * 10/1979 Hayes ....................... F16D 3/78
464/73
(Continued)

FOREIGN PATENT DOCUMENTS

CN 201007324 Y 1/2008
CN 101583805 A 11/2009
(Continued)

OTHER PUBLICATIONS

Chinese Office Action dated Feb. 26, 2019, in connection with the Chinese Patent Application No. 201710351080.9
(Continued)

*Primary Examiner* — Joseph M Rocca
*Assistant Examiner* — Conan D Duda
(74) *Attorney, Agent, or Firm* — Hauptman Ham, LLP

(57) ABSTRACT

The present invention relates to a speed reducer for a vehicle. The speed reducer includes: a first coupler having, on one side thereof, a first coupling portion, to which a motor shaft or a worm shaft is coupled, and, on the other side thereof, a plurality of first protrusions, which are spaced apart from each other in a circumferential direction while protruding in an axial direction, in which the first protrusions are formed in a manner in which a circumferential width of each of the first protrusions is narrowed toward an inner side from an outer side so as to form a first outer support portion as a radial outer end and a first inner support portion as a radial inner end; and a second coupler configured to be coupled to the first coupler to transmit a rotational force to the first coupler.

9 Claims, 8 Drawing Sheets

(51) Int. Cl.
*F16D 1/076* (2006.01)
*F16D 3/12* (2006.01)
*B62D 5/04* (2006.01)
*F16H 55/22* (2006.01)
*F16H 57/021* (2012.01)

(52) U.S. Cl.
CPC ............ *B62D 5/0409* (2013.01); *F16H 55/22* (2013.01); *F16H 2057/0213* (2013.01)

(56) References Cited

U.S. PATENT DOCUMENTS

| | | | | |
|---|---|---|---|---|
| 5,928,083 | A * | 7/1999 | Monahan | F16D 3/68 192/41 R |
| 6,183,368 | B1 * | 2/2001 | King | F16D 3/68 192/55.6 |
| 9,193,384 | B1 * | 11/2015 | Murakami | B62D 5/0454 |
| 2004/0182188 | A1 * | 9/2004 | Nakamura | B62D 5/0409 74/409 |
| 2006/0169528 | A1 * | 8/2006 | Yuasa | B62D 5/0409 180/444 |
| 2006/0205293 | A1 * | 9/2006 | Fuse | B63H 23/34 440/83 |
| 2007/0158131 | A1 * | 7/2007 | Iwasa | B62D 5/0409 180/444 |
| 2007/0163374 | A1 * | 7/2007 | Yamazaki | B62D 5/0409 74/409 |
| 2008/0171603 | A1 * | 7/2008 | Kneeshaw | F16D 3/52 464/49 |
| 2009/0152781 | A1 * | 6/2009 | Yoshii | F16D 3/68 267/141 |
| 2012/0061168 | A1 * | 3/2012 | Hamakita | B62D 5/0409 180/444 |
| 2012/0202605 | A1 * | 8/2012 | Cassell | F16D 3/223 464/85 |
| 2014/0027197 | A1 * | 1/2014 | Kikuchi | B62D 5/0409 180/444 |
| 2014/0116608 | A1 * | 5/2014 | Sato | F16D 3/68 156/245 |
| 2015/0217804 | A1 * | 8/2015 | Moriyama | F16D 3/68 180/444 |
| 2015/0266506 | A1 * | 9/2015 | Sato | B62D 5/0421 180/444 |
| 2015/0275946 | A1 * | 10/2015 | Ishizaki | B62D 1/20 403/359.1 |
| 2015/0298733 | A1 * | 10/2015 | Moriyama | B62D 5/0409 180/444 |
| 2016/0194024 | A1 * | 7/2016 | Kikuchi | B62D 5/0409 180/444 |
| 2017/0036691 | A1 * | 2/2017 | Kikuchi | B62D 3/04 |
| 2017/0129332 | A1 * | 5/2017 | Nishimura | B60K 17/30 |
| 2017/0138408 | A1 * | 5/2017 | Ishizaki | F16D 3/06 |
| 2017/0175821 | A1 * | 6/2017 | Segawa | B62D 5/04 |
| 2017/0335943 | A1 * | 11/2017 | Ko | F16D 1/076 |
| 2018/0066713 | A1 * | 3/2018 | Oosawa | F16D 3/74 |
| 2018/0105113 | A1 * | 4/2018 | Motomiya | B60R 1/074 |
| 2019/0211884 | A1 * | 7/2019 | Ishii | B62D 5/0403 |
| 2019/0234505 | A1 * | 8/2019 | Ishii | F16H 57/021 |
| 2019/0264751 | A1 * | 8/2019 | Oosawa | B62D 5/0409 |

FOREIGN PATENT DOCUMENTS

| | | |
|---|---|---|
| CN | 102837726 A | 12/2012 |
| CN | 104097683 A | 10/2014 |
| CN | 104334902 A | 2/2015 |
| KR | 10-2014-0045158 A | 4/2014 |

OTHER PUBLICATIONS

Korean Office Action dated Jul. 3, 2017 corresponding to Korean Application No. KR 10-2016-0061566.

* cited by examiner

SPEED REDUCER FOR VEHICLE

CROSS REFERENCE TO RELATED APPLICATION

This application claims priority from Korean Patent Application No. 10-2016-0061566, filed on May 19, 2016, which is hereby incorporated by reference for all purposes as if fully set forth herein.

BACKGROUND OF THE INVENTION

1. Field of the Invention

The present invention relates to a speed reducer for a vehicle. Particularly, the present invention relates to a speed reducer for a vehicle in which a damping coupler is provided with an outer support portion and an inner support portion so that the inner support portion can absorb reaction or impact between a worm shaft and a motor shaft while the outer support portion can perfectly transmit the rotational force between the worm shaft and the motor shaft, whereby rattle performance and response performance can be improved. More particularly, the present invention relates to a speed reducer for a vehicle in which a damping slit is formed on the inner support portion, so that the inner support portion can be deformed in the circumferential direction to effectively absorb the reaction or impact of the worm shaft, and as a result, the rattle performance can be improved, and the damping coupler is formed of an elastic material so as not to include a separate elastic body, so that the number of components can be reduced, and the assembly steps can be relatively reduced, whereby the speed reducer can be easily assembled.

2. Description of the Prior Art

FIG. 1 is a cross-sectional view of a conventional speed reducer for a vehicle.

As illustrated in FIG. 1, a conventional speed reducer includes a motor 180, a drive shaft 105, an inner rotor 120, an outer rotor 115, an elastic body 110, a first bearing 150, a worm shaft 135, a worm 145, a second bearing 170, a compression screw 155, a compression spring 165, and a gear housing 160.

The motor 180 has a drive shaft 105 extending to the outside of the motor housing, and the outer rotor 115 has a hollow inner portion and is connected to the drive shaft 105 at one side thereof to be interlocked with the drive shaft 105. The second bearing 170 and the first bearing 150 fix the worn 145 toward the worm wheel 140 installed on the steering shaft 130 in which a torsion bar is embedded. The compression spring 165 supports the worm 145 toward the worm wheel 140 while supporting the second bearing 170 in the state of being abutted against the compression screw 155. Therefore, when the compression screw 155 is tightened, the compression screw 155 is moved so as to contract the compression spring 165. Consequently, the compression force of the compression spring 165 causes the worn 145 to be firmly engaged with the worm wheel 140.

The inner rotor 120 is connected to the worn shaft 135, and the inner rotor 120 is configured to be inserted into the outer rotor 115, one side of which is connected to the drive shaft 105.

FIG. 2 is an exploded perspective view illustrating the structures of the outer rotor and the inner rotor of FIG. 1.

As illustrated in FIG. 2, the damping coupler 210 includes the outer rotor 115 and the inner rotor 120, and the outer rotor 115 has a structure, into which the inner rotor 120 is capable of being inserted. The elastic body 110 is provided on the outer circumferential surface of the inner rotor 120 so that when the inner rotor 120 is inserted into the outer rotor 115, the elastic body 110 is provided between the inner rotor 120 and the outer rotor 115.

In addition, a hole 245 having an axial serration formed therein is perforated through the inner rotor 120, so that the inner rotor 120 is connected to the worm shaft 135 on which a serration 250 is machined to face the axial serration. The outer rotor 115 provided with a hole 215 having a serration formed therein is connected to the drive shaft 105 having an axial serration 225 formed on the outer circumferential surface thereof.

In addition, a rubber pad 270 may further be provided between the inner rotor 120 and the worm shaft 135.

However, in such a conventional speed reducer for a vehicle, the thickness of the elastic body provided between the outer rotor and the inner rotor is constant. Therefore, the rotational rigidity is constant, and as a result, the reaction or impact between the worm shaft and the motor shaft cannot be effectively absorbed, thereby deteriorating rattle performance. The elastic body rather suppresses the radial flow of the worm shaft, thereby deteriorating the clearance compensation function of the damping coupler.

SUMMARY OF THE INVENTION

The present invention has been made under the above-described background, and provides a speed reducer for a vehicle in which a damping coupler is provided with an outer support portion and an inner support portion so that the inner support portion can absorb reaction or impact between a worm shaft and a motor shaft while the outer support portion can effectively transmit the rotational force between the worn shaft and the motor shaft, whereby rattle performance and response performance can be improved.

In addition, the present invention provides a speed reducer for a vehicle in which a damping slit is formed on the inner support portion, so that the inner support portion can be deformed in the circumferential direction to effectively absorb the reaction or impact of the worm shaft, and as a result, rattle performance can be improved.

Further, the present invention provides a speed reducer for a vehicle in which the damping coupler is formed of an elastic material so as not to include a separate elastic body, so that the number of components can be reduced, and the assembly steps can be relatively reduced, whereby the speed reducer can be easily assembled.

The object of the present invention is not limited to those described above, and other objects, which are not described above, may be clearly understood by a person ordinarily skilled in the art from the following description.

According to the present invention, there may be provided a speed reducer for a vehicle, the speed reducer including: a first coupler having, on one side thereof, a first coupling portion, to which a motor shaft or a worm shaft is coupled, and, on the other side thereof, a plurality of first protrusions, which are spaced apart from each other in a circumferential direction while protruding in an axial direction, in which the first protrusions are famed in a manner in which a circumferential width of each of the first protrusions is narrowed toward a radial inner side from a radial outer side so as to form a first outer support portion as a radial outer end and a first inner support portion as a radial inner end; and a second coupler configured to be coupled to the first coupler to transmit a rotational force to the first coupler, and having, on one side thereof, a plurality of second protrusions, which protrude in the axial direction, and a plurality of insertion portions, into which the first protrusions are respectively inserted, and, on the other side thereof, a second coupling portion to which the worm shaft or the motor shaft is coupled, the second protrusions and the insertion portions being famed to alternate in a circumferential direction, in which the second protrusions and the insertion portions are formed in a manner in which a circumferential width of each of the second protrusions and the insertion portions becomes narrower toward a radial inner side from a radial outer side, and each of the second protrusions includes a second outer support portion as a radial outer end and a second inner support portion as a radial inner end.

According to the present invention described above, because a damping coupler is provided with an outer support portion and an inner support portion, so that the inner support portion can absorb reaction or impact between a worm shaft and a motor shaft while the outer support portion can effectively transmit the rotational force between the worn shaft and the motor shaft, rattle performance and response performance can be improved.

Further, because a damping slit is formed on the inner support portion, so that the inner support portion can be deformed in the circumferential direction to effectively absorb the reaction or impact of the worm shaft, rattle performance can be improved.

Further, because the damping coupler is formed of an elastic material so that a separate elastic body is not provided, the number of components can be reduced, and the assembly steps can be relatively reduced. Thus, the speed reducer for a vehicle can be easily assembled.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
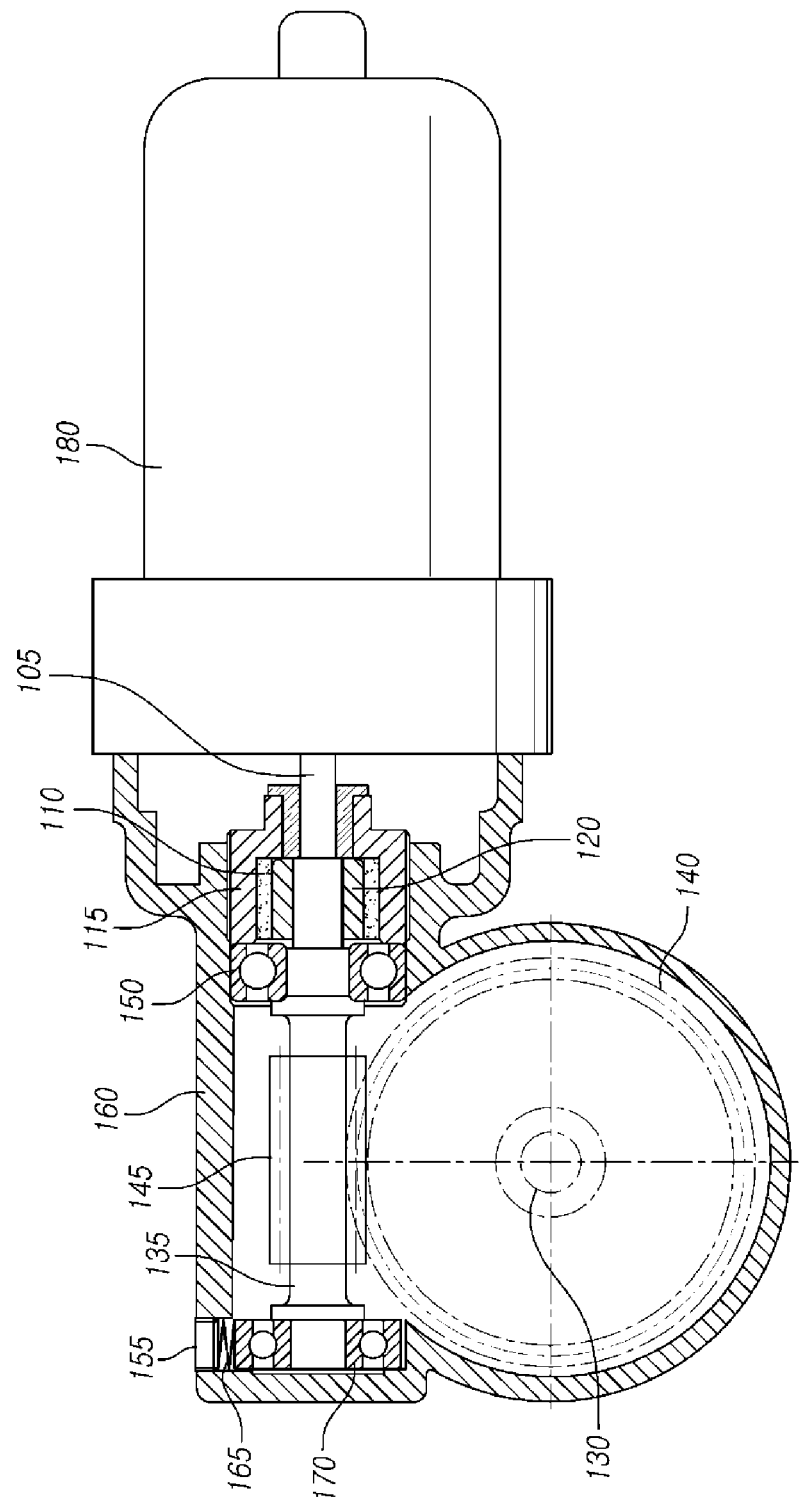
FIG. 1 is a sectional view of a conventional speed reducer for a vehicle.
Figure 2:
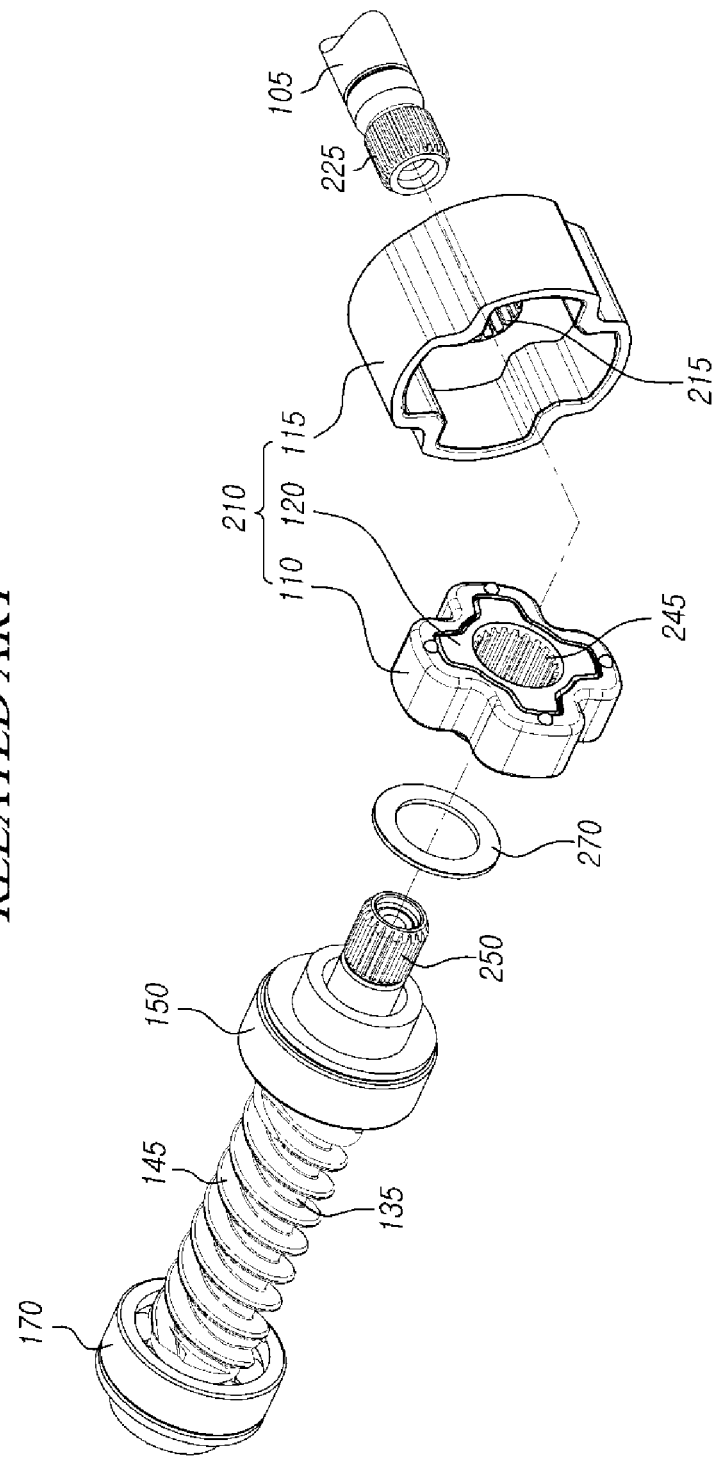
FIG. 2 is an exploded perspective view illustrating the structures of the outer rotor and the inner rotor of FIG. 1.

Hereinafter, embodiments of the present invention will be described in detail with reference to the accompanying drawings. In adding reference numerals to elements in each drawing, it should be noted that the same elements are designated by the same reference numerals, if possible, although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These teams are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
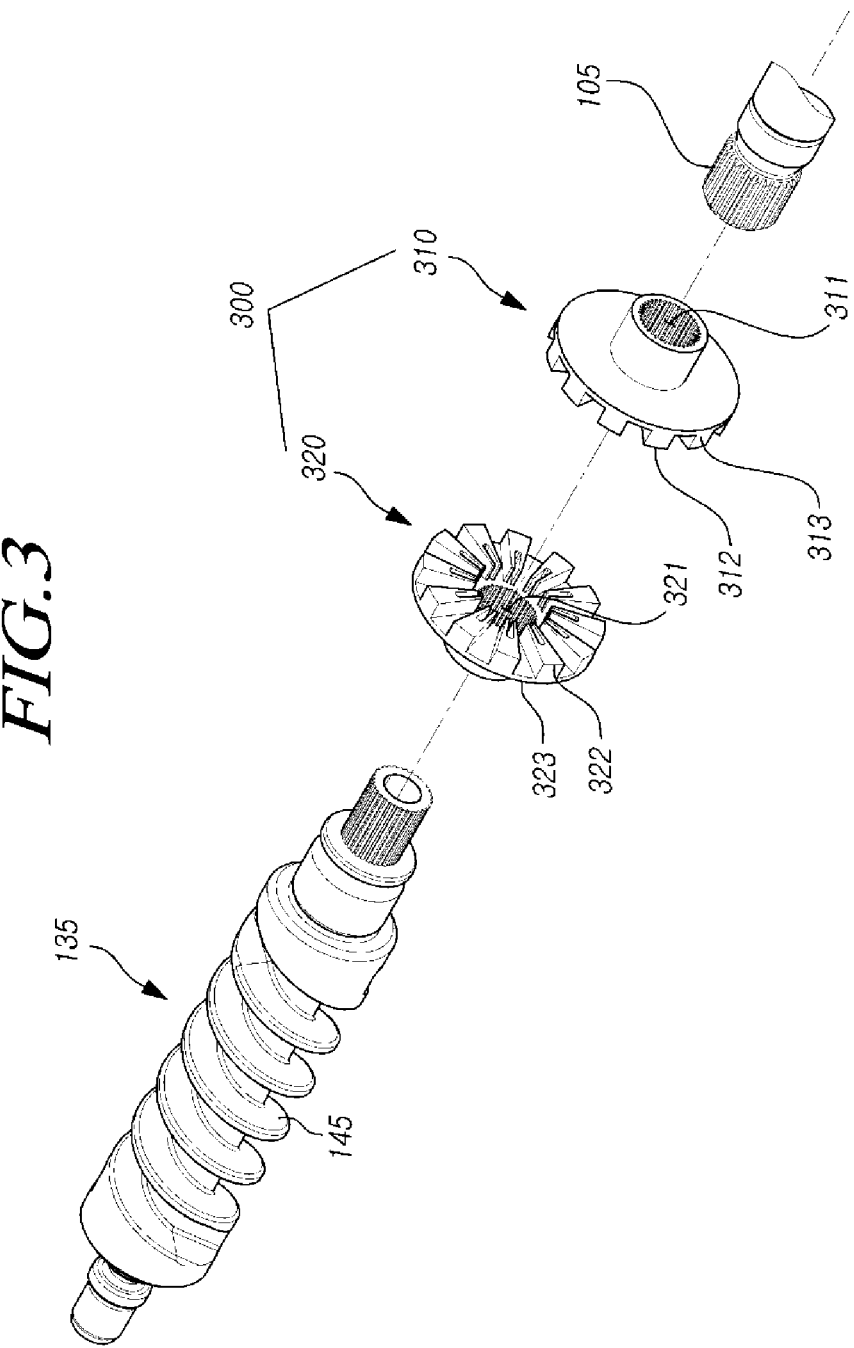
FIG. 3 is an exploded perspective view of a portion of a speed reducer for a vehicle according to an embodiment of the present invention.
Figure 4:
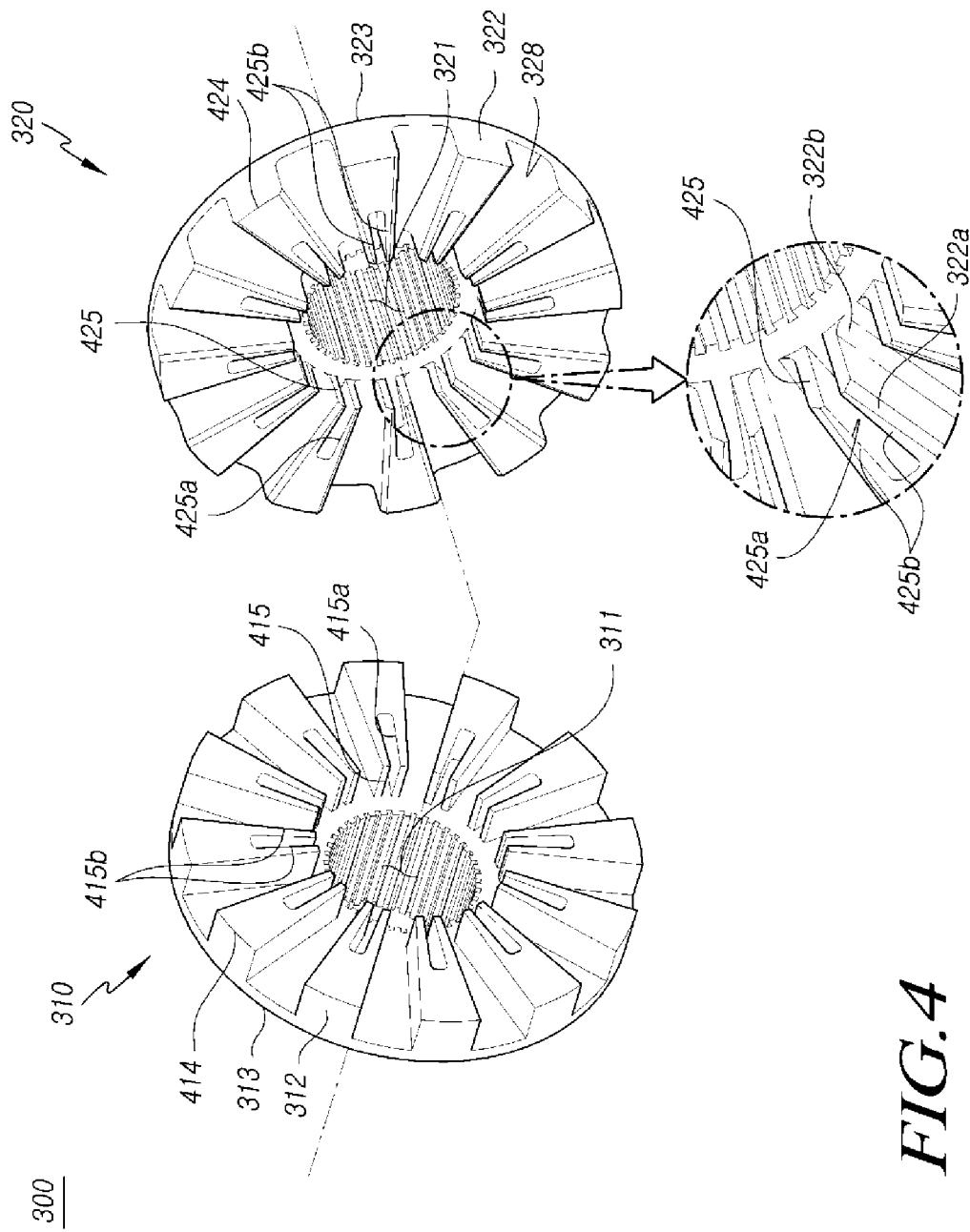
FIG. 4 is an exploded perspective view of the damping coupler of FIG. 3.
Figure 5:
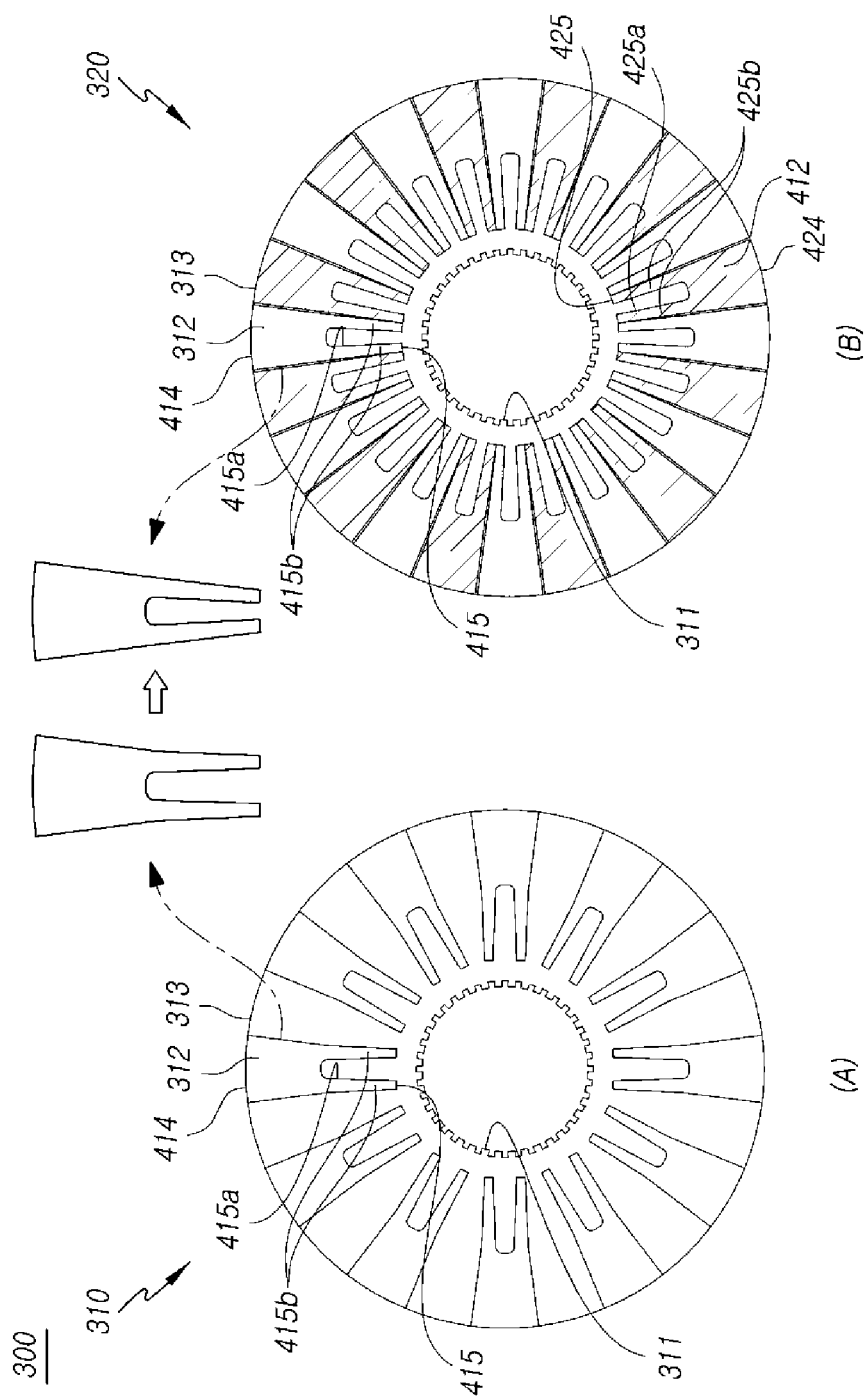
FIG. 5 is a view illustrating a speed reducer for a vehicle according to an embodiment of the present invention before and after a first coupler is coupled.
Figure 6:
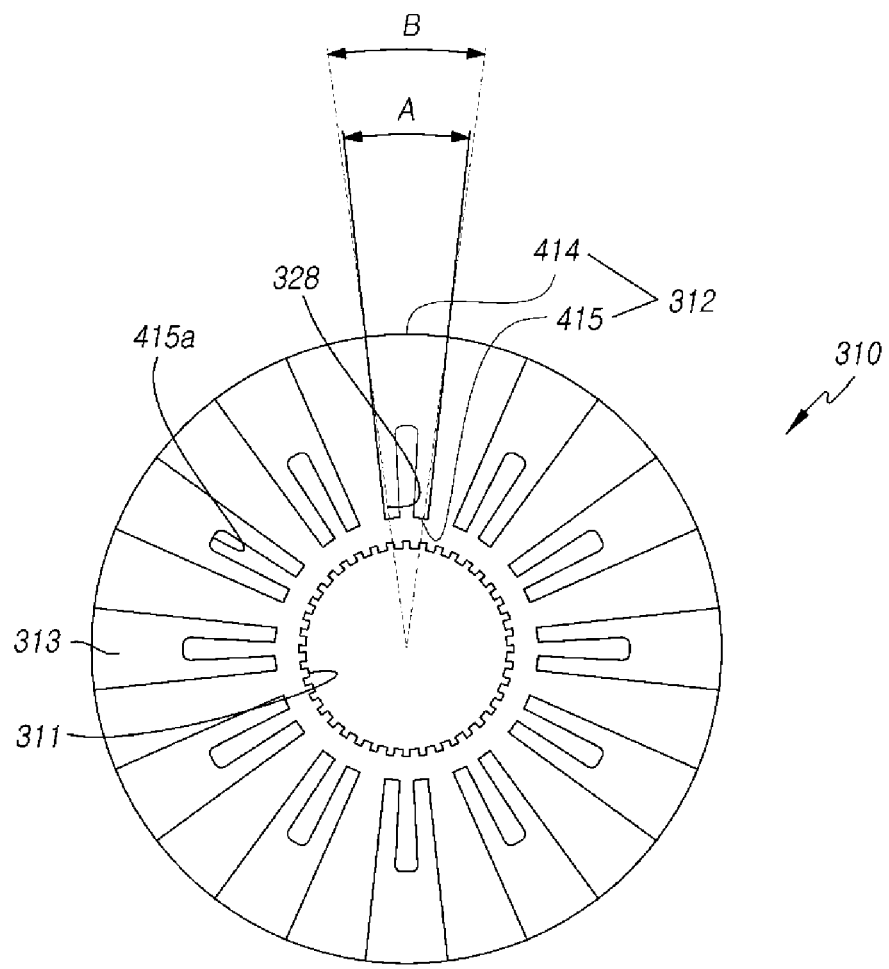
FIG. 6 is a perspective view of a second coupler of a speed reducer for a vehicle according to another embodiment of the present invention.
Figure 7:
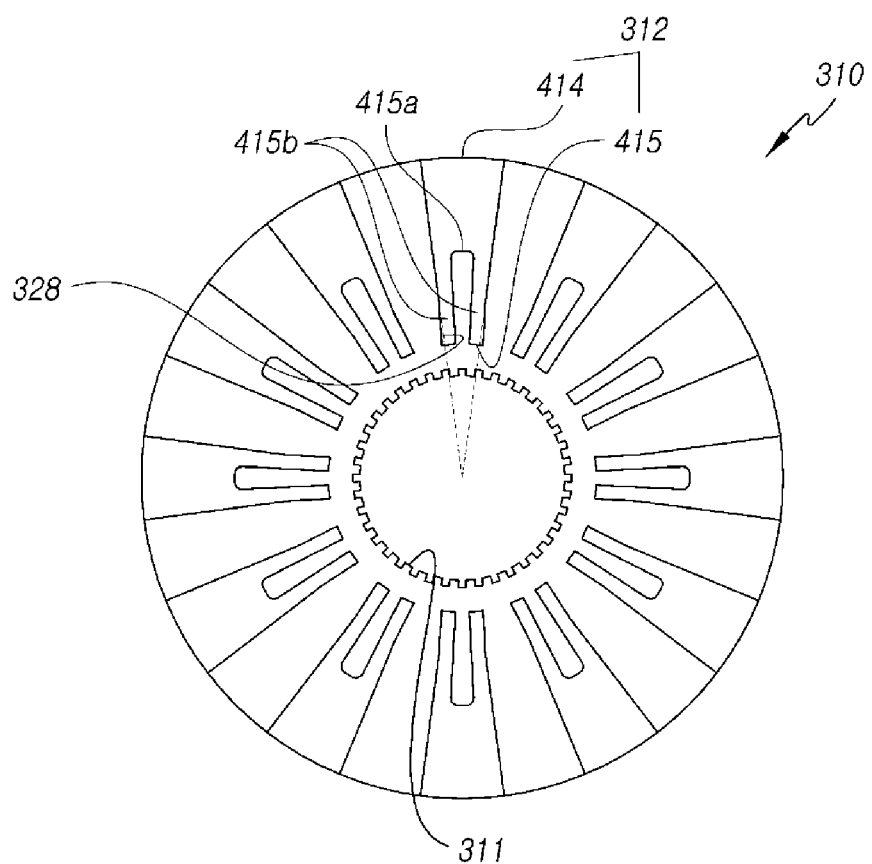
FIG. 7 is a front view of a first coupler of a speed reducer for a vehicle according to still another embodiment of the present invention.
Figure 8:
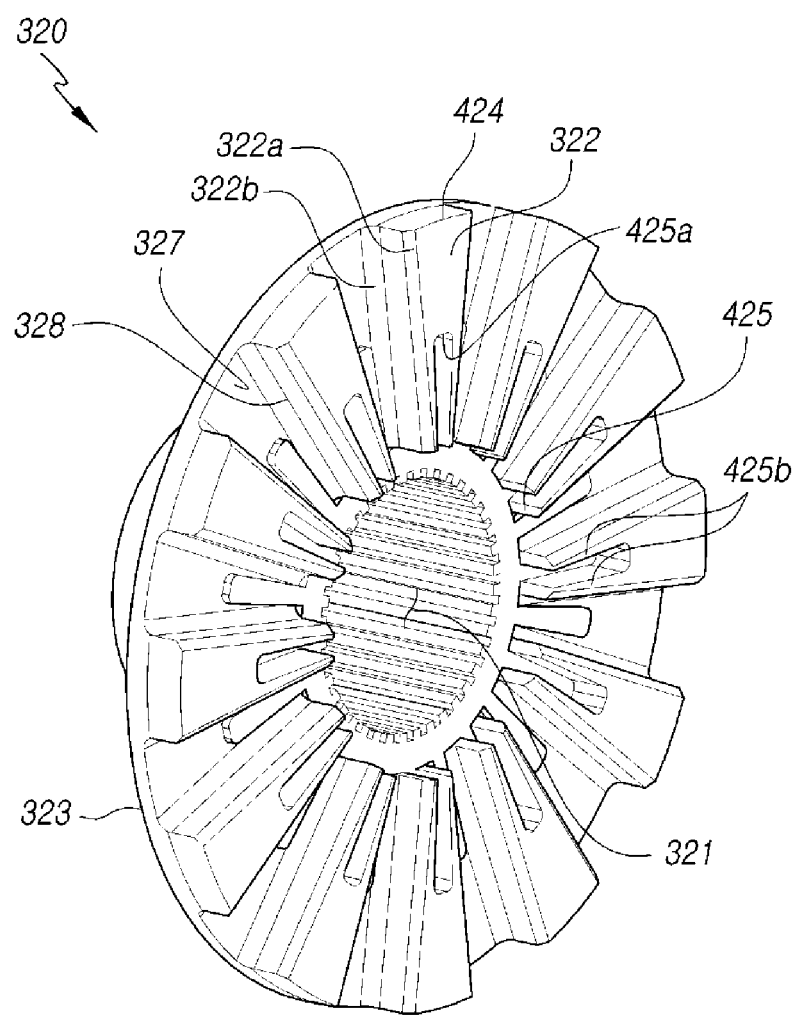
FIG. 8 is a perspective view of a first coupler of a speed reducer for a vehicle according to yet another embodiment of the present invention.

FIG. 3 is an exploded perspective view of a portion of a speed reducer for a vehicle according to an embodiment of the present invention, FIG. 4 is an exploded perspective view of the damping coupler of FIG. 3, and FIG. 5 is a view illustrating a speed reducer for a vehicle according to an embodiment of the present invention before and after a first coupler is coupled. FIG. 6 is a perspective view of a second coupler of a speed reducer for a vehicle according to another embodiment of the present invention, FIG. 7 is a front view of a first coupler of a speed reducer for a vehicle according to still another embodiment of the present invention, and FIG. 8 is a perspective view of a first coupler of a speed reducer for a vehicle according to yet another embodiment of the present invention.

As illustrated in the accompanying drawings including FIG. 1, a speed reducer for a vehicle according to an embodiment of the present invention includes: a first coupler 310 having, on one side thereof, a first coupling portion 311, to which a motor shaft 105 or a worn shaft 135 is coupled, and, on the other side thereof, a plurality of first protrusions 312, which are spaced apart from each other in a circumferential direction while protruding in an axial direction, in which the first protrusions 312 are famed in a manner in which a circumferential width of each of the first protrusions 312 is narrowed toward a radial inner side from a radial outer side so as to form a first outer support portion 414 as a radial outer end and a first inner support portion 415 as a radial inner end; and a second coupler 320 configured to be coupled to the first coupler 310 to transmit a rotational force to the first coupler 310, and having, on one side thereof, a plurality of second protrusions 322, which protrude in the axial direction, and a plurality of insertion portions 328, into which the first protrusions 312 are respectively inserted, and, on the other side thereof, a second coupling portion 321 to which the worm shaft 135 or the motor shaft 105 is coupled, the second protrusions 322 and the insertion portions 328 being formed to alternate in a circumferential direction, in which the second protrusions 322 and the insertion portions 328 are formed in a manner in which a circumferential width of each of the second protrusions 322 and the insertion portions 328 becomes narrower toward a radial inner side from a radial outer side, and each of the second protrusions 322 includes a second outer support portion 424 as a radial outer end and a second inner support portion 425 as a radial inner end.

Such a speed reducer for a vehicle may be applied to any speed reducer that uses a worn and a worm wheel, in addition to a rack and double pinion steering apparatus or an electric power steering apparatus. The present invention will be described with respect to a speed reducer for a vehicle, which is provided in an electric power steering apparatus, as an example.

The worm wheel 140 is meshed with the worn shaft 135, and is coupled to a steering shaft 130 that is connected to a steering wheel (not illustrated).

A worm 145 to be meshed with the worm wheel 140 is formed on the worm shaft 135, and worm shaft bearings 150 and 170 are coupled to the opposite ends of the worm shaft 135. The worn shaft bearings 150 and 170 are engaged with the inner surface of a gear housing 160.

When the motor 180 is driven, a driving force is transmitted to the worm shaft 135 via the damping coupler 300 between the worm shaft 135 and the motor shaft 105 so that the worm shaft 135 is rotated. The damping coupler 300 includes the first coupler 310 and the second coupler 320 to which the motor shaft 105 and the worm shaft 135 are coupled. The present invention will be described with respect to a case in which the motor shaft 105 is coupled to the first coupler 310 and the worm shaft 135 is coupled to the second coupler 320, as an example.

Of course, the worm shaft 135 may be coupled to the first coupler 310, and the motor shaft 105 may be coupled to the second coupler 320.

The first coupler 310 and the second coupler 320 may be formed of an elastic and rigid material, such as a synthetic resin, so as to stably transmit the driving force of the motor 180 without a loss while preventing the occurrence of noise due to impact or vibration between the first coupler 310 and the second coupler 320. The first coupler 310 is formed, on one side thereof, with a first coupling portion 311 to which the motor shaft 105 is coupled. The first coupling portion 311 may be formed on one side of the first coupler 310 as a groove that is recessed by a predetermined depth so that the motor shaft 105 can be fitted thereto, or may be formed as a hole that is opened at the opposite sides so that the motor shaft 105 can be fitted thereto.

A serration is formed on the inner circumferential surface of the first coupling portion 311, and a serration is also famed on the outer circumferential surface of the motor shaft 105 so that the motor shaft 105 is engaged with the first coupling portion 311.

In addition, the first coupler 310 is formed with a first large diameter portion 313 having a large diameter, and the first protrusions 312 protruding in the axial direction are formed on the other side.

The first protrusions 312 are spaced apart from each other in the circumferential direction, and a second protrusion 322 is engaged between every two adjacent first protrusions 312.

The second coupler 320 is famed, on the other side thereof, with a second coupling portion 321 to which the worm shaft 135 is coupled. The second coupling portion 321 may also be formed on the other side of the second coupler 320 as a groove that is recessed by a predetermined depth so that the worm shaft 135 can be fitted thereto, or may be formed as a hole that is opened at the opposite sides so that the motor shaft 105 can be fitted thereto.

A serration is formed on the inner circumferential surface of the second coupling portion 321, and a serration is also formed on the outer circumferential surface of the worm shaft 135 so that the worn shaft 135 is engaged with the second coupling portion 321.

In addition, the second coupler 320 is formed with a second large diameter portion 323 having a large diameter, and the second protrusions 322, which protrude in the axial direction, and the insertion portions 328, into which the first protrusions 312 are respectively inserted, are formed on one side of the second coupler 320. The second protrusions 322 and the insertion portions 328 are famed on the one side of the second coupler 320 to alternate in the circumferential direction.

The second protrusions 322 are spaced apart from each other in the circumferential direction such that a first protrusion 312 is engaged between every two adjacent second protrusions 322, and as a result, when the motor shaft 105 is driven, the rotational force is transmitted to the worm shaft 135.

The inner circumferential surfaces of the first coupler 310 and the second coupler 320, which constitute the damping coupler 300, are engaged with the motor shaft 105 and the worn shaft 135, respectively, in a manner in which each of the second protrusions 322 is engaged between every two adjacent first protrusions 312 and each of the first protrusions 312 is engaged between every two adjacent second protrusions 322.

That is, each second protrusions 322 is inserted between every two adjacent first protrusions 312, so that the driving force of the motor 180 is transmitted to the worn shaft 135 through the damping coupler 300.

Here, because the damping coupler 300 is provided with the first large diameter portion 313 and the second large diameter portion 323, which are larger in diameter than the first coupling portion 311 and the second coupling portion 321, respectively, the circumferential area and volume of each of the first protursions 312 and the second protrusions 322 is increased toward the radial outside.

Therefore, as the area and volume of each of the first protrusions 312 and the second protrusions 322 is increased, the rigidity to support the transmitted rotational load increases, and, when the driving force of the motor 180 is transmitted to the worm shaft 135, the durability of the first coupler 310 and the second coupler 320 is increased.

Each of the first protrusions 312 and the second protrusions 322 is famed substantially in a fan shape, so that the circumferential width becomes narrower toward the inner side from the radial outside in a manner in which each of the first protrusions 312 includes a first outer side support portion 414 as a radial outer end and a first inner support portion 415 as a radial inner end, and each of the second protrusions 322 includes a second outer support portion 424 as a radial outer end and a second inner support portion 425 as a radial inner end.

At this time, each space between every two adjacent first protrusions 312 and each of the insertion portions 328 are also formed to be narrower in the circumferential direction toward the inside from the outside, so that the second protrusions 322 and the first protrusions 312 are inserted into the spaces and the insertion portions, respectively.

Since the outer support portions 414 and 424 are formed to be wider in the circumferential direction toward the radial outer end to have larger rigidity, the inner support portions 415 and 425 can transmit the rotational force while bearing the rotating load, and since the inner support portions 415 and 425 are formed to be narrower in the circumferential direction toward the radial inner end to have smaller rigidity as compared to the outer support portions 414 and 424, the inner support portions 415 and 425 can absorb the reaction force or impact of the worm shaft 135 and the motor shaft 105.

Here, in order to ensure that the inner support portions 415 and 425 can effectively absorb the reaction or impact of the worm shaft 135 and the motor shaft 105, the inner support portions 415 and 425 of the first coupler 310 and the second coupler 320 are compressed against each other to be elastically supported and engaged with each other, and the opposite side surfaces of the outer support portions 414 and 424 are coupled to be spaced apart from each other.

That is, when the first protrusions 312 are inserted into and coupled to the insertion portions 328, a gap is formed between the first outer support portions 414 and the second outer support portions 424 so as to facilitate assembly, and the first inner support portions 415 and the second inner support portions 425 are compressed against each other in the circumferential direction to be elastically supported and engaged with each other, so that the inner support portions 415 and 425 can effectively absorb the reaction or impact of the worm shaft 135 and the motor shaft 105.

Accordingly, as the inner support portions 415 and 425 absorb the reaction or impact of the worm shaft 135 and the motor shaft 105, the outer support portions 414 and 424 can bear and transmit the driving force of the motor 180 to the worm wheel.

In order to facilitate the elastic deformation of the first inner support portions 415 and the second inner support portions 425, the first inner support portions 415 and the second inner support portions 425 are provided with first and second radially extending damping slits 415a and 425a, so that the inside of each of the first inner support portions 415 and the second inner support portions 425 becomes hollow.

That is, a first damping slit 415a is famed to extend to the radial outside from the radial inner end of each first inner support portion 415, and the first inner support portion 415 splits into two support portions 415b with reference to the first damping slit 415a, so that the first damping slit 415a is formed between the two support portions 415b.

In addition, a second damping slit 425a is also formed to extend to the radial outside from the radial inner end of each second support portion 425, and the second inner support portion 425 splits into two support portions 425b with reference to the second damping slit 425a, so that the second damping slit 425a is famed between the two support portions 425b.

Since the damping slits 415a of 425a are famed in the inner support portions 415 or 425 of each of the first coupler 310 and the second coupler 320 as described above, there are provided spaces that allow the inner support portions 415 and 425 to be elastically deformed in the circumferential direction, so that the circumferential elastic deformation of the inner support portions 415 and 425 may be facilitated and the reaction or impact of the worm shaft 135 and the motor shaft 105 may be effectively buffered.

In addition, each first inner support portion 415 is cut on the other side of the corresponding first protrusion 312 so that the first inner supporting portions 415 can be deformed in the circumferential direction from the other side of the first protrusion 312, and the first inner support portion 415 is formed in a manner in which the two support portions 415b are separated from each other on the opposite sides with respect to the first damping slit 415a.

Accordingly, each second inner support portion 425 is integrally formed with the one side of the corresponding second protrusion 322 so that there is a limit in deforming the second inner support portion 425 in the circumferential direction, while each first inner support portion 415 is cut on the other side of the corresponding first protrusion 312 so that the first inner support portion 415 can be easily deformed elastically in the circumferential direction.

When the first inner support portion 415, which is formed to be spread to the opposite sides in this way, is inserted into an insertion portion 328, the first inner support portion 415 is coupled while being compressed in the circumferential direction such that the gap between the two supporting portions 415b is narrowed, and as a result, the two supporting portions 415b elastically support the second inner support portion 425.

Here, because the second inner support portions 425 are formed integrally with the one side of the second protrusion 322, the two support portions 415b of the first inner support portion 415 are coupled between two adjacent second inner support portions 425 in the compressed state.

Specifically, referring to FIGS. 5A and 5B, FIG. 5A is a front view illustrating a state before the first coupler 310 is inserted into the second coupler 320, in which the first coupler 310 is cut between each first inner support portion 415 and the other side of a corresponding first protrusion 312 so that two support portions 415b of the first inner support portion 415 are formed to spread with respect to the damping slit 415a.

On the contrary, FIG. 5B illustrates a state after the first coupler 310 is inserted into the second coupler 320, in which as the first inner support portion 415 is inserted into the insertion portion 328, the two support portions 415b, which have spread, are supported and compressed by the opposite side surfaces of the insertion portion 328, so that the two support portions 415b are engaged with the opposite side surfaces of the insertion portion 328 in the state where the gap between the two support portions 415b is narrowed.

Accordingly, the opposite sides of the insertion portion 328 are elastically supported by the elastic restoration force of the two support portions 415b to spread again, and as a result, the two support portions 415b of the first protrusion 312 elastically support the insertion portion 328 of the second protrusion 322, so that the first coupler 310 and the second coupler 320 elastically support each other in the circumferential direction.

Meanwhile, in order to allow the first protrusion 312 of the first coupler 310 to be easily inserted into the insertion portion 328 of the second coupler 320, the second protrusion 322 has a first tapered portion 322a at an axial outer end thereof, which is formed of an inclined surface or a curved surface.

When the first inner support portion 415 is inserted into the insertion portion 328, the gap between the two support portions 415b of the first inner support portion 415 is narrowed along the inclined surface or the curved surface of the first tapered portion 322a to be inserted into the insertion portion 328, so that the first coupler 310 and the second coupler 320 can be easily coupled to each other, and as a result, the assemblability therebetween can be improved.

In addition, the second protrusion 322 has a second tapered portion 322b at an axial inner end thereof, which is formed of an inclined surface or a curved surface, so that an end of the first inner support portion 415 is coupled to the second tapered portion 322b while being supported.

In this way, when the first and second protrusions 312 and 322 are formed in the first and second couplers 310 and 320 are engaged with and coupled to each other such that the inner support portions 415 and 425 of the first coupler 310 and the second coupler 320 can damp the reaction or impact of the worm shaft 135, the inner support portions 415 and 425 are elastically compressed and coupled to each other in the circumferential direction, and after being coupled, the inner support portions 415 and 425 are elastically supported to each other.

In order to ensure that the first coupler 310 and the second coupler 320 are coupled to each other in the state in which the inner support portions 415 and 425 are elastically supported in the circumferential direction while the outer support portions 414 and 424 are spaced apart from each other, the first protrusions 312 may be famed at an angle smaller than that of the insertion portions 328 or the first inner support portions 415 may be formed to have a large thickness, as illustrated in FIGS. 6 and 7.

Here, among the first coupler 310 and the second coupler 320, FIGS. 6 and 7 illustrate only the first coupler 310, and the second coupler 320 may also be famed as illustrated in FIGS. 6 and 7.

Referring to FIG. 6, the angle A formed by the opposite side surfaces of each first protrusion 312 is smaller than the angle B famed by the opposite side surfaces of each insertion portion 328, so that the first inner support portion 415 of the first protrusion 312 is formed to have a size larger than the space of the insertion portion 328 to be coupled while being compressed in the circumferential direction.

In other words, the smaller the angle A famed by the opposite side surfaces of the first protrusion 312, the greater the compression amount that is required to be compressed when the first inner support portion 415 is inserted into the insertion portion 328. As the compression amount increases, the elastic supporting force in the rotational direction is increased.

In addition, since the angle A formed by the opposite side surfaces of the first protrusion 312 is smaller than the angle B famed by the opposite side surfaces of the insertion portion 328, the compression amount of the first protrusion 312 is increased toward the inside from the outside, and the compression amount of the first inner support portion 415 becomes larger than the compression amount of the first outer support portion 414.

As a result, the first inner support portions 415 can be more closely attached to each other than the first outer support portions 414, and can effectively damped the reaction or impact of the worn shaft 135 and the motor shaft 105.

In addition, as illustrated in FIG. 7, the first inner support portions 415 are coupled to the insertion portions 328, in a manner in which the first inner support portions 415 are compressed in the circumferential direction because each of the first inner support portions 415 has a circumferential width that is wider than the circumferential width of each of the insertion portions 328.

In this case, the first inner support portions 415 are coupled in the state in which the gap between two support portions 415b, which are split from each first inner support portion 415 to the opposite sides with respect to a first damping slit 415a, is narrowed, so that the first inner support portions 415 and the insertion portions 328 elastically support each other, and as a result, the first inner supporting portions 415 can effectively damp the reaction or impact of the worm shaft 135 and the motor shaft 105.

In addition, as illustrated in FIG. 8, a recess 327 having a shape corresponding to the first protrusion 312 is formed by being axially recessed in each insertion portion 328 of the second coupler 320, and when the coupler 310 and the second coupler 320 are coupled to each other, the first protrusion 312 can be inserted into and coupled to the recess 327, so that assemblability can be improved and the first coupler 310 and the second coupler 320 can be assembled to be accurately positioned therebetween.

According to the embodiments having the shapes and structures as described above, because a damping coupler is provided with an outer support portion and an inner support portion, so that the inner support portion can absorb reaction or impact between a worm shaft and a motor shaft while the outer support portion can effectively transmit the rotational force between the worm shaft and the motor shaft, rattle performance and response performance can be improved.

Further, because a damping slit is formed on the inner support portion, so that the inner support portion can be deformed in the circumferential direction to effectively absorb the reaction or impact of the worm shaft, rattle performance can be improved.

Further, because the damping coupler is formed of an elastic material so that a separate elastic body is not provided, the number of components can be reduced, and the assembly steps can be relatively reduced. Thus, the speed reducer for a vehicle can be easily assembled.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A speed reducer for a vehicle, the speed reducer comprising:
    a first coupler having, on one side thereof, a first coupling portion, to which a motor shaft or a worm shaft is coupled, and, on the other side thereof, a plurality of first protrusions, which are spaced apart from each other in a circumferential direction while protruding in an axial direction, in which the first protrusions are formed in a manner in which a circumferential width of each of the first protrusions is narrowed toward a radial inner side from a radial outer side so as to form a first outer support portion as a radial outer end and a first inner support portion as a radial inner end; and
    a second coupler configured to be coupled to the first coupler to transmit a rotational force to the first coupler, and having, on one side thereof, a plurality of second protrusions, which protrude in the axial direction, and a plurality of insertion portions, into which the first protrusions are respectively inserted, and, on the other side thereof, a second coupling portion to which the worm shaft or the motor shaft is coupled, the second protrusions and the insertion portions being formed to alternate in a circumferential direction, in which the second protrusions and the insertion portions are formed in a manner in which a circumferential width of each of the second protrusions and the insertion portions becomes narrower toward a radial inner side from a radial outer side, and each of the second protrusions includes a second outer support portion as a radial outer end and a second inner support portion as a radial inner end, wherein the first inner support portion includes a first damping slit formed to extend radially outwardly, and the second inner support portion includes a second damping slit formed to extend radially outwardly.

2. The speed reducer of claim 1, wherein the first protrusions are inserted into and coupled to the insertion portions, respectively, and a gap is formed between the first outer support portion and the second outer support portion such that the first inner support portion and the second support portion are elastically supported while coming into close contact with each other.

3. The speed reducer of claim 1, wherein the first inner support portion has an axial inner end that is cut on the other side of the first protrusion so that the first inner support portion is formed to spread to both sides with respect to the first damping slit, and when the first inner support portion is inserted into the insertion portion, the first inner support portion is coupled to the insertion portion while being elastically deformed in the circumferential direction.

4. The speed reducer of claim 3, wherein an angle formed by opposite side surfaces of the first protrusions is smaller than an angle formed by opposite side surfaces of the insertion portion.

5. The speed reducer of claim 3, wherein the first inner support portion is formed to have a circumferential width that is wider than that of the insertion portion.

6. The speed reducer of claim 3, wherein the second protrusion includes a first tapered portion that is formed of an inclined surface or a curved surface on an axial outer end thereof.

7. The speed reducer of claim 3, wherein the second protrusion includes a second tapered portion that is formed of an inclined surface or a curved surface on an axial inner end thereof.

8. The speed reducer of claim 3, wherein the insertion portion has a recess having a shape corresponding to that of the first protrusion and formed by being recessed in an axial direction, and the first protrusion is coupled to the recess.

9. The speed reducer of claim 1, wherein the first and second coupling portions, the motor shaft, and the worm shaft are formed with serrations such that each of the first and second coupling portions is engaged with one of the motor shaft and the worm shaft.

* * * * *